(12) United States Patent
Parrish et al.

(10) Patent No.: US 6,406,210 B1
(45) Date of Patent: Jun. 18, 2002

(54) CAPTIVATED JACKSCREW DESIGN

(75) Inventors: Brian E. Parrish, Garden Grove; Ryan S. Berkely, Long Beach, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/190,715

(22) Filed: Nov. 12, 1998

(51) Int. Cl.[7] .............................. F16B 13/08; F16B 5/02
(52) U.S. Cl. .............................. 403/16; 403/235; 403/7; 403/12; 411/107
(58) Field of Search ................................ 403/16, 12, 11, 403/250, 256, 259; 411/350, 352, 353, 107, 999

(56) References Cited

U.S. PATENT DOCUMENTS

| | | | | |
|---|---|---|---|---|
| 2,376,089 A | * | 5/1945 | Savageau | 411/999 |
| 3,109,663 A | * | 11/1963 | Phillips, Jr. | 403/235 |
| 3,164,354 A | * | 1/1965 | Murdock | 256/59 X |
| 3,263,549 A | * | 8/1966 | Jordan et al. | 296/256 |
| 3,812,895 A | * | 5/1974 | Smith | 411/352 |
| 4,105,058 A | * | 8/1978 | Bunn et al. | 151/41.74 |
| 4,139,315 A | * | 2/1979 | Levy et al. | 403/19 |
| 4,261,666 A | * | 4/1981 | Katayama | 403/235 |
| 4,436,445 A | * | 3/1984 | Templeman | 403/189 |
| 4,540,304 A | * | 9/1985 | Pavelka et al. | 403/12 |
| 4,711,760 A | * | 12/1987 | Blaushild | 411/109 X |
| 4,863,326 A | * | 9/1989 | Vickers | 403/118 |
| 4,869,694 A | * | 9/1989 | McCormick | 403/16 X |
| 5,269,622 A | * | 12/1993 | Mullenberg | 403/370 |
| 5,370,472 A | * | 12/1994 | Muellenberg | 403/370 |
| 5,676,511 A | * | 10/1997 | Meylan | 411/372 |
| 5,857,798 A | * | 1/1999 | Flynn | 403/256 |
| 5,941,669 A | * | 8/1999 | Aukzemas | 411/107 |

FOREIGN PATENT DOCUMENTS

| | | | |
|---|---|---|---|
| EP | 0111958 | | 6/1984 |
| GB | 828194 | * | 9/1955 |
| WO | WO95-25896 | * | 9/1995 |

* cited by examiner

*Primary Examiner*—Lynne H. Browne
*Assistant Examiner*—Ernesto Garcia
(74) *Attorney, Agent, or Firm*—Ronald M. Goldman

(57) ABSTRACT

A novel captivated jackscrew structure is characterized by the formation of both an internal cavity (15) within one of the two bodies that are to be connected together and an access passage (17). One end of the cavity, located at one end of the body is open. The small diameter access passage extends through the other end of the body into the cavity's other end. A standard machine screw (1) is installed head (3) first and captured within the cavity, with the screw shaft (5) protruding from the end of the body (20). A barrier (7) is provided to prevent withdrawal of the machine screw head, but permit the screw head and shaft to move a limited distance axially within the cavity. A backstop (9), resembling an inverted cup with a hole in the bottom lies in inverted position in the cavity over the screw's head.

5 Claims, 4 Drawing Sheets

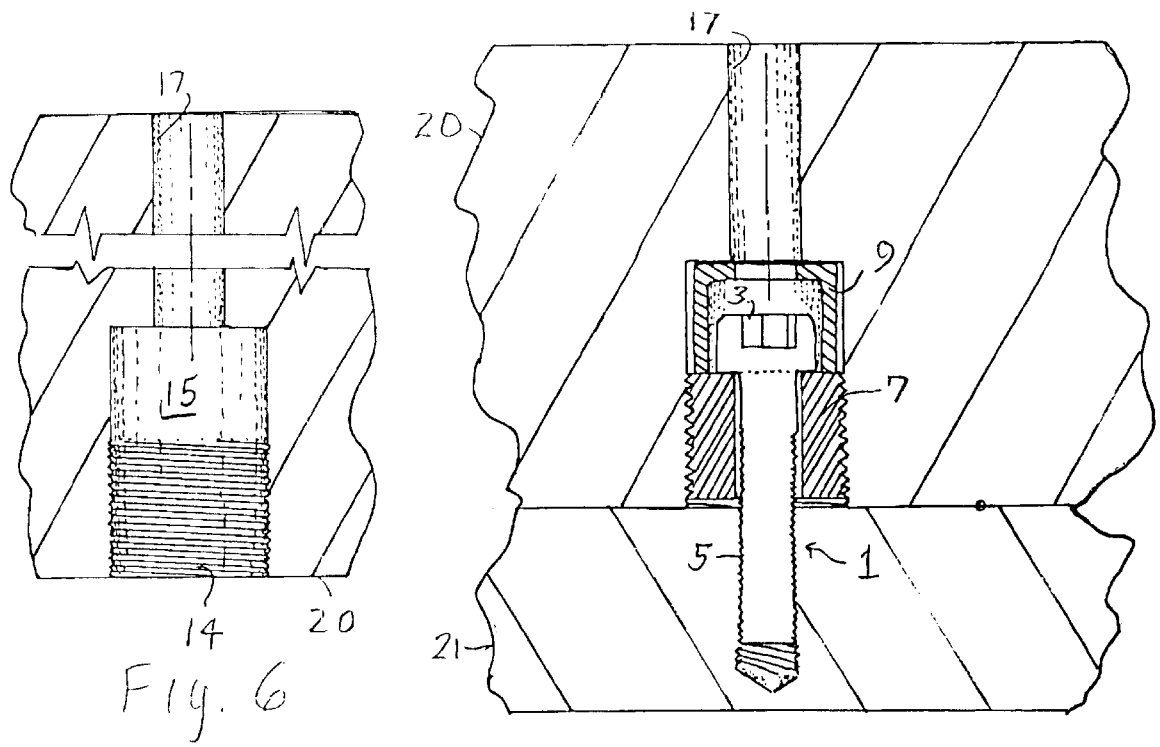
Fig. 6
Fig. 7
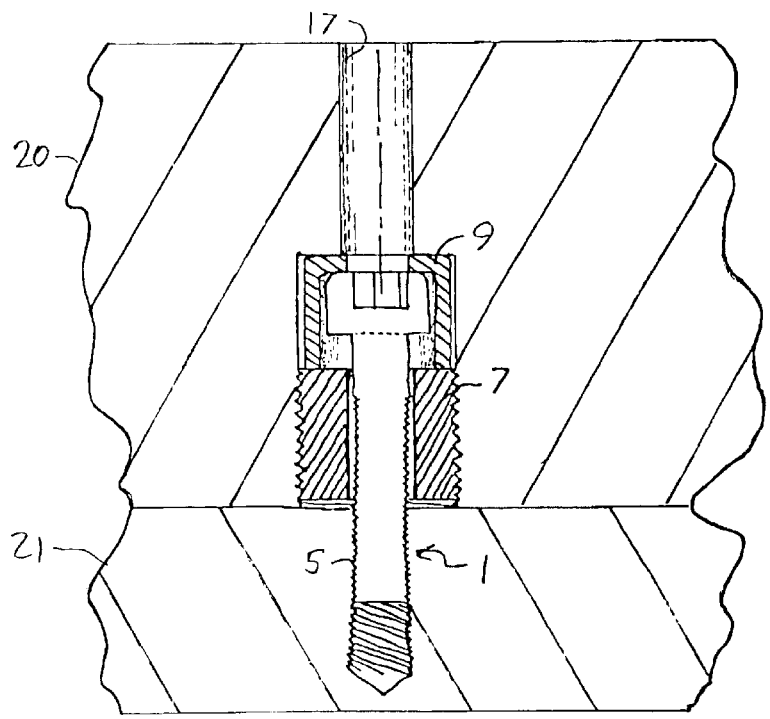
Fig. 8

CAPTIVATED JACKSCREW DESIGN

STATEMENT OF GOVERNMENT SUPPORT

This invention was conceived during the course of Contract or Subcontract No. F04701-97-C-0025 with the United States Air Force, Space and Missiles Command. The government has certain rights in this invention.

FIELD OF THE INVENTION

This invention relates to captivated jackscrews, and, more particularly, to a new, more rugged and improved captivated jackscrew design.

BACKGROUND

Mating or connecting two metal panels or frames together is easily accomplished with standard fastener's, such as machine screws. For that, one of the panels includes a clearance hole which allows the machine screw's threaded shaft to pass through, but not the screw head. The screw is then screwed into an associated threaded hole formed in the second panel. Another elementary alternative to the foregoing is the conventional bolt and nut arrangement. The bolt is extended through drilled clearance holes in the two metal panels and a threaded nut is threaded onto the bolt shaft and tightened, compressing the panels between the bolt head and the nut.

If for any reason some time later one wishes to detach the two panels, one may discover that detachment may not be as easy. Assuming one is successful in removing the machine screws and/or nut and bolts, one may find that the two metal panels remain stuck together. Over the years corrosion, metal migration, electrical corrosion or the like, or for other reasons, hereafter described, may have occurred between the two metal panels or frames form an additional binding, which must be broken to detach the two, often requiring great force and/or leverage. One finds it's very difficult or near impossible to separate the two panels.

The captivated jack screw was designed to avoid the problem of separating metal sheets where such circumstances are anticipated. The conventional jackscrew, which the present invention improves upon, includes a narrow slot peripherally extending about the screw's shaft, a reduced diameter shaft portion in the machine screw's shaft, located at an axial position below the screw's head, typically by a distance equal to the thickness of the panel, and an E-clip, a somewhat U-shaped flat spring steel member that fits into that reduced diameter slot. The machine screw's shaft is extended through the hole in the panel member, leaving the screw's head on one side of the panel, unable to pass through the hole, and positioning the narrow slot on the other side of the panel member. The e-clip is forced into place laterally in the narrow slot, its arms, under the spring force, gripping the shaft.

The e-clip is larger in size than the panel's screw hole. Hence, the clip prevents the machine screw from being withdrawn from the hole. In effect, the screw is captured on the panel, and cannot fall off. Further, the e-clip does not prevent rotational movement of the screw shaft, the shaft and e-clips may rotate as a set within the panel or independently. With the screw thus captured, using a machine screw driver, the screw's threaded shaft is screwed into the threaded hole in the second panel. When the screw is tightened, the two panels are fastened together with the sides of the e-clip in between and generally located in a small recess in either panel. The clip does not contact either panel when the two are fastened together.

To then later detach the panels, the machine screw is turned in the opposite direction than before, counterclockwise, for example, withdrawing the screw from its mating threaded hole in the second panel. As the screw's shaft axially moves out of that threaded hole, the shaft in turn moves the reduced diameter portion in which the e-clip is fixed, but permitting clip rotation, and, hence, also carries the e-clip axially out with the shaft. Since one side of the clip abuts the underside of the first panel, the clip, which is fixed in axial position on the screw shaft, is forced by the screw shaft to push the first panel away from the second. Those familiar with the screw type jack used to raise a home off its foundation easily recognize that in separating the two panels, the foregoing screw and e-clip structure forms a jack arrangement, wherein the side of the e-clip serves as the jack's table. The screw type jack obtains a mechanical advantage, multiplying the smaller torque required to rotate the screw threads to a larger force exerted along the axis of the screw shaft. Ideally such a force breaks any naturally formed binding between the panels. In reality its functionality is limited.

Captivated jackscrews have served in many applications. As example, although the foregoing description describes one example of the captivated jack screw's use in connecting two panels, it also serves to mate or join mating male and female multi-contact electrical connectors and to de-mate those connectors. Typically multi-contact electrical connectors are used to join the many electrical wires within an electrical cable or on one electrical component to a mating electrical connector on electrical equipment, placing the wires into the proper electrical circuits within the equipment. Those connectors are typically fastened together with clips or screws, and some of the latter may be captivated jack screws.

With higher quality connectors to ensure reliable electrical connections, the female contacts in a connector are designed to grip the associated male contacts of the other connector with a significant force. With large numbers of such contacts the total force required is quite large. This gripping action produces a binding between the mating connectors. Thus, great force is required both to mate or fully insert one connector into its mate and, later, to demate or separate the connectors. With the captivated jackscrew arrangement, unscrewing the machine screw pushes one connector away from the mating connector to perform de-mating disconnection, minimizing the user's effort. This feature is particularly helpful if the connectors are located in places that are difficult to access or difficult to grip by hand, and especially in applications in which mating and de-mating of the connectors is required frequently.

Although of simple and inexpensive structure, the e-clip and necked machine screw design attains a functional limit as a jack when the binding forces are quite large. First, the "necked" design for the machine screw in which the screw shaft is modified to contain a constricted diameter portion, weakens the screw shaft. Inadvertently exceeding the torque applied to the screw during the jacking operation could break the shaft and cause an expensive and time consuming on-site repair. More likely, the overly great forces applied to the sides of the e-clip during the jacking operation causes this thin spring steel member to twist and distort its geometry, withdrawing the ends thereof from the neck in the machine screw holding the e-clip in place on the screw. With those gripping ends released, the e-clip comes free. Once released from the fastener shaft, it may be exceedingly difficult to separate the two panels.

As an advantage, the present invention does not employ such frail clips and is able to handle greater torques than the foregoing e-clip design. It also avoids the necessity of necking the machine screw and weakening the screw shaft, making use instead of a standard, unmodified fastener.

Accordingly, a principal object of the invention is to provide a more rugged and reliable captivated jackscrew design, one that can handle greater loads than existing e-clip designs.

A further object of the invention is to provide a captivated jackscrew design that uses a standard fastener, such as a machine screw, avoiding the necessity for "necked" screws and concomitant weakening of the machine screw shaft.

SUMMARY OF THE INVENTION

In accordance with the foregoing objects and advantages, the novel captivated jackscrew of the present invention is characterized by the formation of an internal cavity within one of the two bodies that are to be connected together and an access passage to that cavity; one end of the cavity, located at one end of the body is open, and the access passage extends through the other end of the body into the other end of that cavity. A standard machine screw is installed head first within the cavity, with the screw shaft, being of greater length than the cavity, protruding from the end of the body. A barrier is provided to prevent withdrawal of the machine screw head, but permit the screw head and shaft to move a limited distance axially.

In the preferred embodiment, the screw head is oriented in the cavity to permit a screw driver, such as an Allen wrench, to access the screw head through the access passage. In a second less preferred embodiment the screw shaft, being greater in length than the access passage, is positioned extending through and beyond the end of the access passage; and driver access to the machine screw head is provided through the barrier.

In another specific aspect to the invention, a portion of the internal cavity walls contains a screw thread and the barrier is of a cylindrical shape containing mating screw threads along the outer wall and a central passage there through. The diameter of that central passage is smaller than the head of the machine screw. The barrier is thus screwed into place plugging the open end of the cavity and "captivating" or preventing withdrawal of the screw head.

In yet another specific aspect of the invention a backstop is included in the cavity adjacent the end containing the access passage. The backstop prevents the machine screw head from rubbing directly against the body, particularly the end wall of the cavity.

The foregoing and additional objects and advantages of the invention together with the structure characteristic thereof, which was only briefly summarized in the foregoing passages, and equivalents thereto becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the drawings:

FIG. 6 is a partial section view of a body that is to be fastened using the embodiment of FIG. 1, illustrating the modifications required to receive the elements of FIG. 1 in place;

FIG. 7 is a section of the embodiment of FIG. 1 as applied to fasten two metal bodies together;

FIGS. 8 and 9 respectively illustrate in section two stages of de-mating the two metal bodies of FIG. 7 employing the jacking action of the captivated jackscrew;

DESCRIPTION OF THE PREFERRED EMBODIMENTS

Figure 1:
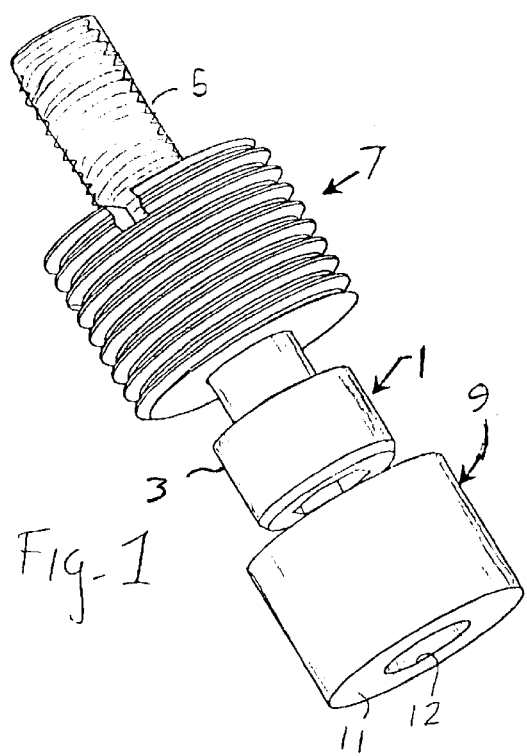
FIG. 1 illustrates the principal elements of one embodiment of the novel fastener system in a perspective view.

The principal components of the fastening system are illustrated in FIG. 1, to which reference is made. As shown in a perspective view, the system includes a cap head type screw 1 of conventional structure that contains a head 3 and a threaded shaft 5; a barrier or, as alternatively termed, insert member 7; and a backstop member 9, all of which are of metal, as example stainless steel. The foregoing components are illustrated in the relationship with which they are to be assembled together and incorporated within one of the two metal bodies or structures intended to be fastened or connected together, later herein described. As shown in this figure, the screw shaft extends through an axial passage in insert member 7.

Figure 2:
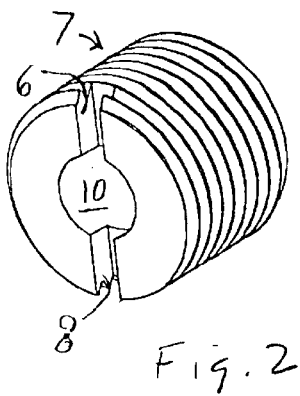
FIG. 2 illustrates the insert member element used in the embodiment of FIG. 1 shown in perspective as viewed from the opposite end presented in FIG. 1.

As shown in FIG. 2, viewing insert member 7 from the opposite end, the left end of the insert member contains a pair of notches or slots 6 and 8, extending in line diametrically across the member's end, which assist to thread the insert member into a threaded hole in one of those bodies, as later herein described. The central cylindrical passage 10 formed axially through insert member 7 is larger in diameter than machine screw shaft 5, permitting the shaft to easily slip through the passage. However, that passage is smaller in diameter or size than machine screw head 3, which is blocked from passing through the passage, the right end of the insert member serving as an abutment or barrier.

Figure 3:
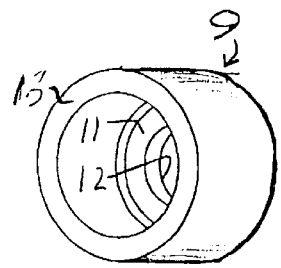
FIG. 3 illustrates a backstop member element used in the embodiment of FIG. 1 shown in perspective as viewed from the opposite end presented in FIG. 1.

Reference is made to FIG. 3 which illustrates backstop member 9 in perspective as viewed from the left end. Backstop member 9 is essentially a hollow cylinder, resembling an inverted bowl or cup with a hole in the bottom. The cylinder is open at one end and partially closed at the opposite end by a washer shaped wall 11. The latter wall includes a central circular opening 12. The front edge 13 of the backstop member defines a circular rim and serves as an abutment. Referring again to FIG. 1, the outer diameter of backstop member 9 is less than the diameter of insert member 7. The size of cylindrical passage 12 is slightly greater than the six sided hexagonal notch recessed in the upper surface of the machine screw 3, and, for greater versatility later herein discussed in connection with an alternative embodiment, is, preferably, larger in diameter than shaft 5. In this embodiment, Passage 12 allows a hex head wrench to access head 3 in order to rotate the machine screw 1.

Figure 4:
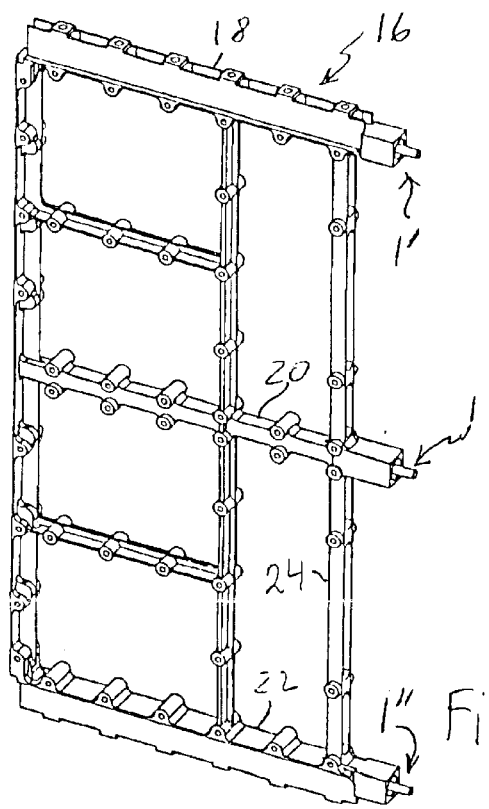
FIG. 4 illustrates a metal frame incorporating a number of the captivated jackscrews of FIG. 1.

As earlier described, the foregoing elements are but a part of the fastener system. The remaining elements are required to be formed within the metal body of the structure that is to capture the machine screw 1 and be fastened by that machine screw to a second structure containing the tapped hole in which the machine screw is to be inserted and tightened. As example, reference is made to FIG. 4 illustrating a metal frame structure 16, which is an example of the structure that employs one or more of the fasteners. That frame structure forms a framework that, as example, supports multiple electronic circuit boards, not illustrated, and multiple electronic connectors, not illustrated.

Frame structure 16 includes three parallel extending spaced frame members 18, 20 and 22 and a bottom cross bar 24 along one side. Electrical connectors are supported on an attached circuit board near the cross bar with their contacts facing the same direction as the ends of frame members 18, 20 and 22. Frame structure 16 is to be attached at a right angle to another metal frame member, not illustrated, essentially making an "edge" connection.

To accomplish that connection, frame member 16 incorporates the captivated jackscrew system, including the elements presented in FIGS. 1–3. To that end, as example, each leg 16, 20 and 22 includes at the outer end one of the captivated jackscrew systems. Thus machine screw 1 projects from leg 20; and corresponding machine screws 1' and 1" project from legs 18 and 22, respectively. The second frame member, not illustrated, contains tapped holes in the frame member that are aligned with the foregoing machine screws. The second frame member also contains mating electrical connectors that are to mate with those electrical connectors on frame 16 and also supports one or more electrical circuit boards, some times referred to as the "mother board". When the two frames are connected together the electrical connectors mate and interconnect the electrical circuits.

Figure 5:
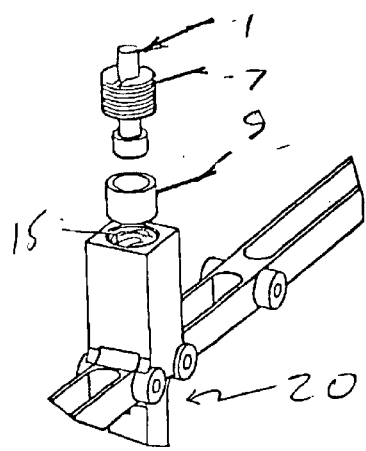
FIG. 5 is an enlarged partial exploded view of the captivated jackscrew assembly depicted in FIG. 4.

Returning to the further description of the captivated jackscrew, reference is made to FIG. 5 which presents an exploded view of one of the jackscrew elements earlier described. The end of leg 20 contains a cylindrical cavity 15 containing a screw thread on the inner cylindrical wall. That cavity is large enough in diameter and deep enough to receive both backstop member 9 and insert member 7, with the head of machine screw 1 captured there between. Thus backstop member 9 is dropped into cavity 15, and screw 1 is placed through the central opening in insert member 7. Then the insert member is rotated or screwed into place within the threaded cavity, suitably until stopped by the backstop, member 9, as the insert touches the front edge 13. The insert will be flush with the surface of leg 20 or recessed slightly within the leg, the exact position not being critical.

Turning of member 7 is accomplished by inserting a screwdriver into one of the slots 6 and 8, illustrated in FIG. 2, or by a specially constructed key containing two spaced prongs that fit within the respective notches. When assembled, since the length of the screw shaft 5 is greater than the height of the internal cavity 15, a portion of the machine screw's threaded shaft 5 extends out of the end of the insert member 7, such as was shown in FIG. 4.

The particular details of the internal cavity and other structure within leg 20 is better illustrated in the section view of the leg end drawn in a slightly larger scale presented in FIG. 6 to which reference is made.

As shown cavity 15 contains threads 14 along the bottom portion of the cavity height or, as variously termed, length, essentially to a depth within the cavity that is sufficient to permit insert member 7 to be fully installed. A narrow cylindrical passage 17, referred to as an access passage, formed within the leg 20 opens into the closed end of cavity 15 and is coaxial therewith. That passage extends in a straight line to the other end of the leg. A machine screw driver, such as a hex head wrench with a long shaft, can be inserted into this passage for driving connection with the head of the machine screw as hereinafter described in greater detail.

Reference is next made to FIG. 7 illustrating in section the foregoing captivated jackscrew system connecting one structure, partially illustrated, which may represent leg 20 and associated frame work earlier illustrated in FIG. 4 or any other metal body, to a second metal body 21. As illustrated, insert member 7 is screwed into place in the threaded cavity 15 and on one side abuts an end edge of backstop member 9, essentially forming a smaller cavity within cavity 15 that confines the head 3 of machine screw 1. The machine screw is captured with a portion of shaft 5 extending from the end of body 20. Placing body 20 in proper alignment so that screw shaft 5 is coaxial with the tapped hole in the second body 21, screw 1 is screwed into body 21 and tightened.

The latter is accomplished by inserting a hex head torque wrench of the appropriate shaft length through passage 17, and through the hole 12 in the end of backstop member 11, into engagement with socket formed in head 3, and turning the wrench clockwise. When tightened, the threads in the tapped hole applies force that extends through screw shaft 5 to the machine screw head 3 and through that head, imposes a downward force on insert 7. In turn, the insert couples that force through the threads into a downward force on body 20 to press the end of body 20 against, or in the direction of, the surface of the second body 21. In that way the two bodies are essentially mechanically connected together.

In the succeeding figures, the two bodies are shown to be in contact. However, it is realized that actual contact is not necessary to mechanically connect or couple the two illustrated bodies together. In some instances the connection would be between accessory articles carried at the edges of the two bodies that are clamped together by those bodies and it may not be necessary to provide the additional support affording by permitting the two bodies to be in contact. However, the preferred way is to have the two bodies in contact.

Ideally insert 7 is screwed into place within the cavity and tightened to a torque greater than the torque to which machine screw 1 is tightened. That prevents the machine screw, which, when tightened down, is in frictional contact with the end of insert 7, from inadvertently rotating insert 7 out of its position.

When the two bodies are to be disconnected from one another, the reverse procedure is undertaken. That is, the hex head wrench is inserted through passage 17 to engage the machine screw head 3, and the wrench is rotated in the opposite direction. The resulting action is partially illustrated in FIGS. 8 and 9, next considered.

As illustrated in FIG. 8, after a few turns in the reverse direction machine screw 1 is withdrawn a certain axial extent from the tapped hole in metal body 21, which releases the clamping force between the bodies 20 and 21. As shown the machine screw has been withdrawn to a position that abuts the end wall of the backstop member 9. As described in the background to the invention, merely removing the clamping pressure by loosening of the machine screw does not detach or decouple, as variously termed, bodies 20 and 21. External elements or forces, not illustrated, likely continue to bind the two bodies together.

Such a binding force may be exerted by the many connector contacts in the electrical connectors that have been joined together in the example earlier given in connection with the discussion of FIG. 4. The gripping force of those contacts is sufficient to hold the two members together, notwithstanding the release of screw pressure.

As one practical example, body 20 may support four multi-contact electrical connectors which together may contain in total 1824 contacts. With each contact exerting a gripping force of about two ounces, as example, about 228 pounds of force is required to separate the four connectors, and, hence bodies 20 and 21 in the illustration of FIGS. 7–9. It is difficult or impossible for a normal individual to be able to grip the two bodies by hand and exert that level of force to pull the bodies apart.

Figure 9:
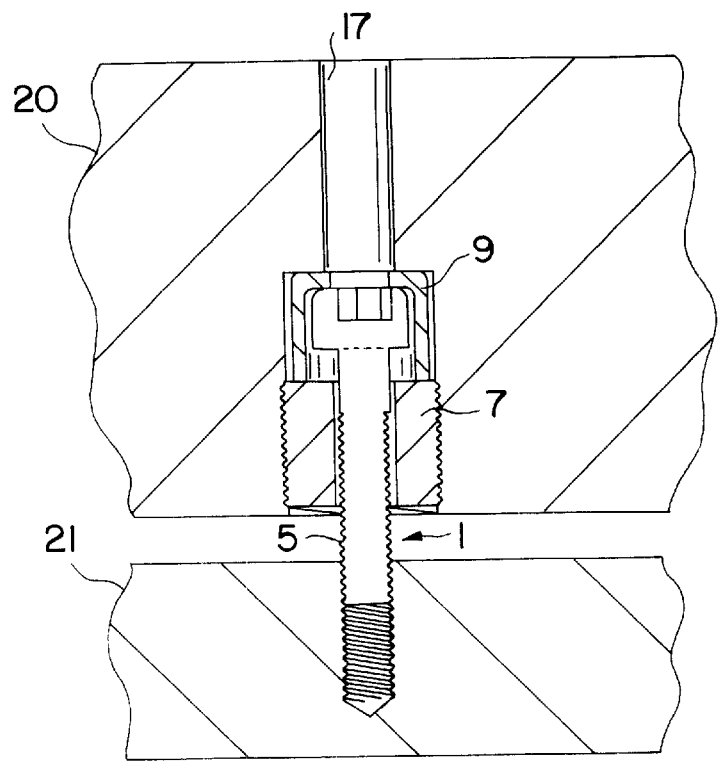

To perform that separation, the machine screw now functions as a jack. Continuing to turn the wrench, the machine screw's head 3 is pressed harder against the inner side of the end wall of backstop 9. The user is required to exert greater torque at this time. As illustrated in FIG. 9, with continued turning of machine screw 1, the machine screw head, presses axially vertically on backstop 9 and lifts the backstop, and the frame structure, forcefully overcoming any force holding body 20 to body 21, such as, as example, the electrical connectors in the example earlier given or the corrosion referenced in the background to this specification.

The frame structure 20 is thereby lifted off of and decoupled from the second body 21. Like any jack, the user is provided with a mechanical advantage, converting the incremental turning torque to an axial force that is magnified in dependence upon the number of turns per axial inch in the thread. Once the first body has been lifted off the second body, the amount of torque required to turn the machine screw is again reduced. The user continues to turn the screw until the shaft is entirely withdrawn from the tapped hole in body 21 and body 20 may be fully separated and removed to another location.

As the reader recognizes the foregoing operation presumed that the two bodies were held together with a single captivated jackscrew system, when, in the example given in FIG. 4, three captivated jackscrews were illustrated. However, with multiple jackscrews, one need only operate each individual jackscrew momentarily and then proceed to the next and so on, returning to the first jackscrew that was operated and repeating the process again through all the jackscrews until all are tightened and/or removed, depending upon the particular action desired. In that way one ensures that the forces are applied evenly so as to avoid bending or otherwise distorting the shape of the structure's cross bar and/or body.

Figure 10:
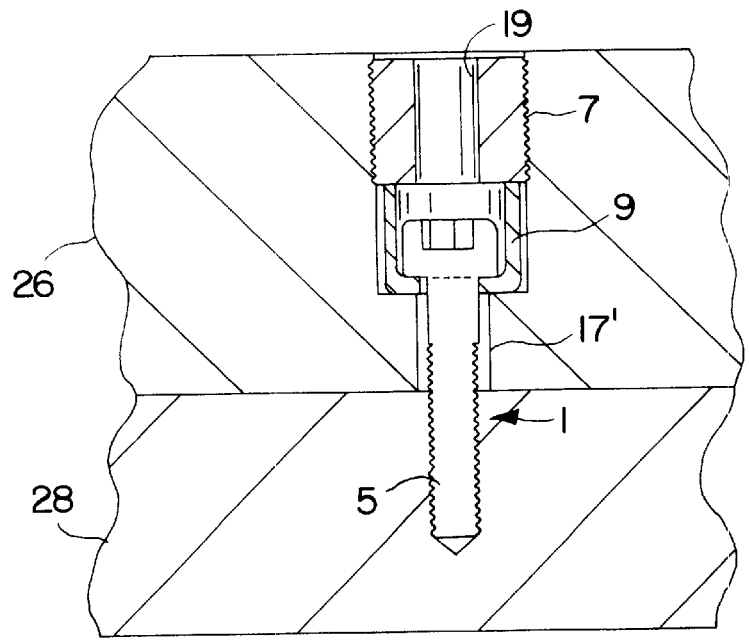
FIG. 10 illustrates an alternative embodiment of the invention.

The foregoing completes the description of a preferred embodiment of the new captivated jackscrew system. Using the same external elements as in the preceding embodiment, an alternative embodiment can be formed with the same external elements of insert, backstop and machine screw. Reference is made to FIG. 10, which illustrates an alternative embodiment in section view as applied to join a pair of metal bodies 26 and 28. For convenience, the numerals used to identify the elements in the preceding embodiment are used again where they appear in this embodiment. The same cylindrical internal cavity and cylindrical access passage is formed in the thicker body 26 as in the preceding embodiment, but in this the access passage 17' is shorter. A portion of the length of that internal cavity is threaded. The shaft 5 of machine screw 1 is of significantly greater length than the length of that access passage.

Here machine screw 1 is inserted through the passage through backstop member 9 and the backstop and screw are put into place with the screw shaft extending through and out access passage 17' in body 26. The insert member 7 is then screwed into place within the mating threaded cavity, thereby captivating the machine screw head 3 within the inner formed cavity.

Torquing and untorquing of screw 1 is accomplished by inserting the hex head torque wrench through the central passage 19 in insert member 7. The jack type action in this embodiment occurs when the screw head 5 is backed off and pressed against the side of insert member 7, to push body 26 away from body 28.

This particular embodiment is useful in those instances in which body 26 is much more thin than that illustrated in the prior embodiment, although it must have sufficient thickness to hold both the insert member 7 and backstop 9.

A simplification of the captivated jackscrew structure is possible, providing one is willing to accept an attendant reduction in benefit. In each of the preceding embodiments, the backstop member, insert member and machine screw were constructed of stainless steel, which is both hard and strong, and the body that is modified to accept those elements in accordance with the preceding description can be formed of a softer metal such as aluminum. Thus in the preceding embodiments, during the jacking action occurring during demating, the machine screw head rubs against a steel member, either the side of the backstop member or of the insert member, depending on the particular embodiment. Being strong, that rubbing or scraping action does not scrape off any of the steel, a process referred to as "culling". Where the bodies being fastened serve to hold sensitive electronic members and have very fine interconnection lines, dropping minute scraps of metal onto those circuit boards could create electrical short-circuits and otherwise damage the equipment. The foregoing embodiments thus protect against that unwanted occurrence.

Figure 11:
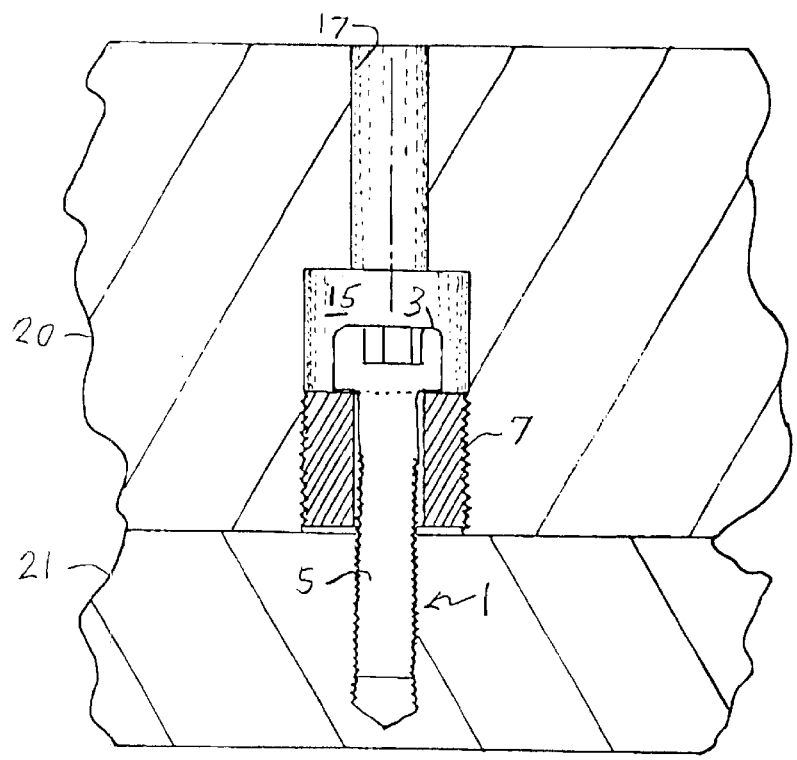
FIG. 11 illustrates a less preferred embodiment of the invention.

If culling may be disregarded, then a more simplified structure for the captivated jackscrew is possible, such as illustrated in the embodiment of FIG. 11 to which reference is next made. In this figure, the elements are presented in section as fastened and applied to bodies 20 and 21. For convenience, where the elements of this embodiment are the same as in the prior embodiments, the same numeral is used for identification. As inspection of FIG. 11 reveals, the structure is identical with the structure presented in the embodiment of FIG. 1, except that backstop 9 is omitted. Thus during the jacking operation required to separate the two bodies, head 3 is placed in abutment with the end wall of internal cavity 15, corresponding to FIG. 8 in the operation of the first embodiment. Continued counter-rotation of the screw, rotates the head while the head is pressed against that cavity wall, providing a scraping action in addition to jacking. If body 20 is formed of Aluminum and head 3 of Stainless Steel, some particles of Aluminum will necessarily be culled.

Figure 12:
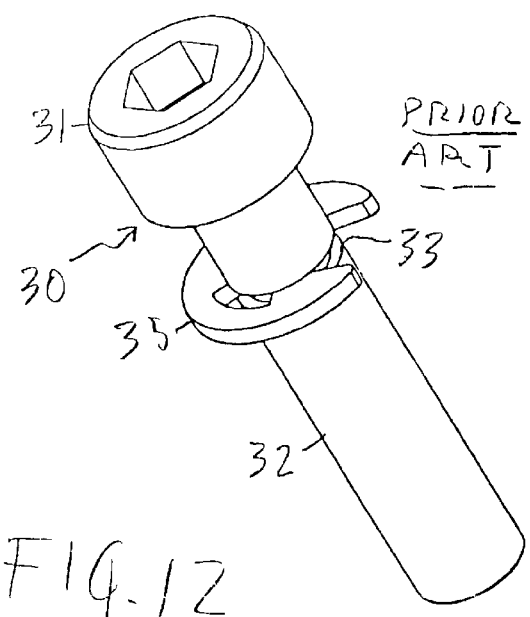
FIG. 12 is a perspective of a prior art captivated jackscrew that uses an e-clip.

The existing e-clip type of fasteners were earlier described, and, to ensure an understanding of the advantages to the invention, it is helpful to illustrate that fastener. The e-clip type fastener is illustrated in perspective in FIG. 12 to which reference may be made. As shown, the fastener is very simple in structure. That fastener contains two parts a machine screw 30 with a cap head 31 containing a hexagonal notch, a threaded shaft 32, and a reduced diameter or constricted diameter portion 33 at a position along the shaft, forming a slot about the shaft periphery. An e-clip 35 is fitted into the constricted portion.

The e-clip is pushed into place on the modified machine screw. Pushed from the back the open ends spread side ways and enter the slotted section. Being formed of spring steel material, the inherent elasticity, the restoring spring force, forces the ends of those arms inwardly to grip the reduced diameter section of the screw and hold the clip in place. A third short arm, not visible in the figure, located in between the two arms on the back end also fits within the constricted diameter slot. As one appreciates, the reduced diameter section permits less torque than would be possible with the full diameter of the shaft. Further one can easily see how the clip can be lifted out of the slot by a large force directed in the axial direction against one or both of the clip's arms.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A combination for making a mechanical screw connection in metal structures, comprising:

a first metal structure, said first metal structure including front and back ends defining a cavity internal of said first metal structure;

said cavity having first and second ends and being of a predetermined length, said first end of said cavity being located at said front end of said first metal structure and said second end of said cavity being located internally within said first metal structure at a predetermined position between said front and back ends of said first metal structure;

said first metal structure further includes a passages internal of said first metal structure, said passage extending from said back end of said first metal structure through said second end of said internal cavity;

a machine screw, said machine screw including a head and a shaft;

said shaft comprising a predetermined length and diameter and including screw threads, said screw threads extending from a distal end of said shaft over at least a portion of said length of said shaft;

said head being captured within said internal cavity and said shaft projecting outwardly from said first metal structure beyond one of said front and rear ends of said first metal structure;

an insert for capturing said head within said internal cavity, said insert being positioned entirely within said internal cavity and being attached to said first structure for barring withdrawal of said machine screw head from said internal cavity, said insert including a central passage there through, said central passage being axially aligned with said passage in said first metal structure;

a backstop, said backstop being positioned within said internal cavity in between said head and said second end of said internal cavity to prevent said head from contacting said second end of said internal cavity and limiting maximum insertion of said insert within said internal cavity; said backstop including a passage there through, and said backstop member passage being axially aligned with said passage in said first metal structure and said central passage in said insert; and said head being wider than said passage of said first structure, said passage in said backstop, and said central passage of said insert, and said diameter of said shaft being smaller than said passage of said first structure, said passage in sail backstop, and said central passage of said insert to prevent passage of said head, but permit extension of said shaft;

and wherein said combination further comprises an insert for capturing said head within said internal cavity, said insert being positioned within said cavity and attached to said first structure for barring withdrawal of said machine screw head from said internal cavity, said insert including a central passage there through;

and wherein said insert comprises a cylinder having first and second ends and a cylindrical outer wall;

and wherein said internal cavity further comprises a cylindrical geometry and contains a cylindrical side wall;

said cylindrical side wall including a screw thread, said screw thread extending from said first end of said cavity a predetermined axial distance; and wherein said cylindrical outer wall of said insert includes a screw thread for mating engagement with said screw thread of said cylindrical inner wall of said cavity;

and wherein said backstop member further comprises an inverted bowl shaped body containing a cylindrical axially extending passage there through;

and wherein said inverted bowl shaped body comprises a hollow cylinder including a cylindrical wall and first and second ends;

said first end of said hollow cylinder being open and bordered by a circular edge, and said second end of said hollow cylinder comprising a washer shaped wall;

said washer shaped wall containing a central circular passage, and said central circular passage being slightly larger in diameter than said shaft and smaller in size than said head.

2. A combination for making a mechanical screw connection, comprising:

a first structure, said first structure including front and back ends, defining a cavity internal of said first structure;

said cavity having first and second ends and being of a predetermined length, said first end of said cavity being located at said front end of said first structure and said second end of said cavity being located internally within said first structure at a predetermined position between said front and back ends of said first structure;

said first structure further including a passage internal of said first structure, said passage extending from said back end of said first structure through said second end of said internal cavity;

a machine screw, said machine screw including a head and a shaft;

said shaft comprising a predetermined length and diameter and including screw threads, said screw threads extending from a distal end of said shaft over at least a portion of said length of said shaft;

said head being captured within said internal cavity and said shaft projecting outwardly from said first structure beyond one of said front and rear ends of said first structure;

an insert for capturing said head within said internal cavity, said insert being positioned entirely within said internal cavity and being attached to said first structure for barring withdrawal of said machine screw head from said internal cavity, said insert including a central passage there through, said central passage being axially aligned with said passage in said first structure;

a backstop member, said backstop member being positioned within said internal cavity in between said head and said second end of said internal cavity to prevent said head from contacting said second end of said internal cavity and limiting maximum insertion of said insert within said internal cavity; said backstop including a passage there through, and said passage of said backstop member being axially aligned with said passage in said first structure and said central passage in said insert;

said head being wider than each of said passage of said first structure, said passage in said backstop, and said central passage of said insert; and said diameter of said shaft being smaller than each of said passage of said first structure, said passage in said backstop, and said central passage of said insert to thereby prevent passage of said head there through, while permitting extension of said shaft there through;

wherein said backstop member further comprises: an inverted bowl shaped body containing a cylindrical axially extending passage there through; and wherein said inverted bowl shaped body comprises:
a hollow cylinder including a cylindrical wall and first and second ends;
said first end of said hollow cylinder being open and bordered by a circular edge, and said second end of said hollow cylinder comprising a washer shaped wall;
said washer shaped wall containing a central circular passage, and said central circular passage being slightly larger in diameter than said shaft of said machine screw and smaller in size than said head of said machine screw;
wherein said insert comprises a cylinder, having first and second ends and a cylindrical outer wall; and
wherein one end of said insert abuts said circular edge of said hollow cylinder of said bowl shaped body.

3. The invention as defined in claim 2, wherein said shaft extends through said central passage in said insert and projects outwardly from said first structure beyond said front end of said first structure; and said passage in said first structure permits driver access to said head for rotationally driving said machine screw.

4. The invention as defined in claim 2, wherein said shaft extends through said second end of said cavity and through said passage in said first structure and projects outwardly from said first structure beyond said back end of said first structure; and wherein said central passage in said insert permits driver access to said head for rotationally driving said machine screw.

5. A fastening system for fastening to a separate metal body, said separate metal body including a threaded screw hole, comprising:

a machine screw, said machine screw including a head of diameter D1 and height L1 and a shaft of diameter D2 and length L2, said shaft including screw threads for threading engagement with said threaded screw hole of said separate metal body, said screw threads extending from a distal end of said shaft over at least a portion of said length L1;

a cylinder having top and bottom ends, a cylindrical outer wall, and a central cylindrical passage extending between said top and bottom ends and coaxial with said cylindrical outer wall, said central passage being of greater diameter than said shaft diameter and smaller in diameter than said head for permitting extension of said screw shaft therethrough and blocking passage of said head; said cylindrical outer wall including screw threads;

a hollow cylinder, said hollow cylinder including a cylindrical wall and first and second ends;

said first end of said hollow cylinder being open and bordered by a circular edge, and said second end of said hollow cylinder comprising a washer shaped wall;

said washer shaped wall containing a central circular passage, said central circular passage being slightly larger in diameter than said shaft of said machine screw and smaller in size than said head of said machine screw;

a first body having front and back ends and defining a cylindrical internal cavity having a circular open end at said front end of said first body, having a washer-shaped rear end wall located within said first body and an inner cylindrical wall; said inner cylindrical wall including screw threads;

a cylindrical passage within said first body, said cylindrical passage extending from said back end of said first body through said rear end wall and opening into said cylindrical internal cavity, said cylindrical passage being oriented coaxial with said cylindrical internal cavity;

said cylinder and said hollow cylinder being positioned entirely within said internal cavity and said cylinder being in threaded engagement with said threads of said inner cylindrical wall of said cylindrical internal cavity;

said head of said machine screw being positioned within said internal cavity, whereby said screw head may abut an end of said cylinder, and said shaft of said machine screw extending through said cylindrical passage through said cylinder and beyond the front end of said first body;

said hollow cylinder being disposed in said internal cavity with said washer shaped wall of said hollow cylinder abutting and in coaxial alignment with said washer shaped rear end wall of said internal cavity.

* * * * *